(12) United States Patent
Hay et al.

(10) Patent No.: US 10,977,800 B1
(45) Date of Patent: Apr. 13, 2021

(54) IMAGE ACQUISITION AND DETAILED VISUAL INSPECTION OF COMPONENT IN PERIODIC MOTION

(71) Applicant: RDI TECHNOLOGIES, INC., Knoxville, TN (US)

(72) Inventors: Jeffrey R. Hay, Louisville, KY (US); Kenneth Ralph Piety, Knoxville, TN (US); Mark William Slemp, Tellico Plains, TN (US)

(73) Assignee: RDI TECHNOLOGIES, INC., Knoxville, TN (US)

( * ) Notice: Subject to any disclaimer, the term of this patent is extended or adjusted under 35 U.S.C. 154(b) by 0 days.

(21) Appl. No.: 16/777,228

(22) Filed: Jan. 30, 2020

Related U.S. Application Data

(63) Continuation-in-part of application No. 16/748,065, filed on Jan. 21, 2020.

(60) Provisional application No. 62/795,189, filed on Jan. 22, 2019.

(51) Int. Cl.
*G06T 7/20* (2017.01)
*G06T 7/00* (2017.01)
*H04N 7/18* (2006.01)

(52) U.S. Cl.
CPC .............. *G06T 7/20* (2013.01); *G06T 7/0004* (2013.01); *H04N 7/188* (2013.01); *G06T 2207/10016* (2013.01); *G06T 2207/30164* (2013.01)

(58) Field of Classification Search
CPC ..................... G06T 7/20; G06T 7/0004; G06T 2207/30164; G06T 2207/10016; H04N 7/188
See application file for complete search history.

(56) References Cited

U.S. PATENT DOCUMENTS

| | | | |
|---|---|---|---|
| 6,636,220 B1 | 10/2003 | Szelisk et al. | |
| 9,922,428 B2 | 3/2018 | Liu et al. | |
| 10,250,868 B1* | 4/2019 | Arnold | G11B 27/19 |
| 2002/0005895 A1* | 1/2002 | Freeman | H04N 5/772 |
| | | | 348/143 |
| 2004/0196448 A1* | 10/2004 | Rembe | G02B 21/361 |
| | | | 356/23 |
| 2009/0083814 A1* | 3/2009 | Sekine | H04N 21/4314 |
| | | | 725/104 |
| 2009/0244261 A1* | 10/2009 | Maehner | G01B 11/2522 |
| | | | 348/46 |

(Continued)

*Primary Examiner* — Carol Wang
(74) *Attorney, Agent, or Firm* — Wyatt, Tarrant & Combs, LLP; Stephen C. Hall

(57) ABSTRACT

Embodiments disclosed herein include, but are not limited to, methods for capturing video sampling data comprising a plurality of video images of a moving object, for example using one or more cameras positioned on a stationary frame of reference adjacent to the mechanical component under investigation, in which an external trigger is used for image acquisition (in some embodiments, one image per revolution or cycle) similar in result to an internal clock or timed pulse can act as a command over a camera to obtain visual data from which the movement of the component or object can be acquired and studied, and further producing video of motion from a series of images to detect, amplify, or enlarge an appearance of motion present as a result of components not coming back to their original locations.

16 Claims, 10 Drawing Sheets
(9 of 10 Drawing Sheet(s) Filed in Color)

(56) References Cited

U.S. PATENT DOCUMENTS

| | | | |
|---|---|---|---|
| 2009/0273704 A1* | 11/2009 | Pincenti | H04N 5/23212 |
| | | | 348/349 |
| 2012/0229659 A1 | 9/2012 | Solomon | |
| 2015/0239686 A1* | 8/2015 | Stone | B65G 69/003 |
| | | | 414/401 |
| 2016/0085840 A1* | 3/2016 | Dixit | G06F 3/0481 |
| | | | 707/602 |
| 2016/0171309 A1 | 6/2016 | Hay | |
| 2016/0210747 A1 | 7/2016 | Hay et al. | |
| 2016/0217574 A1 | 7/2016 | Kang et al. | |
| 2016/0217587 A1 | 7/2016 | Hay | |
| 2016/0217588 A1 | 7/2016 | Hay | |
| 2016/0300341 A1 | 10/2016 | Hay et al. | |
| 2017/0109984 A1 | 4/2017 | Child et al. | |
| 2017/0180645 A1 | 6/2017 | Weckel et al. | |
| 2017/0359549 A1 | 12/2017 | Baran et al. | |
| 2018/0194314 A1* | 7/2018 | Da Costa | B60R 21/0134 |

* cited by examiner

FIGURE 1
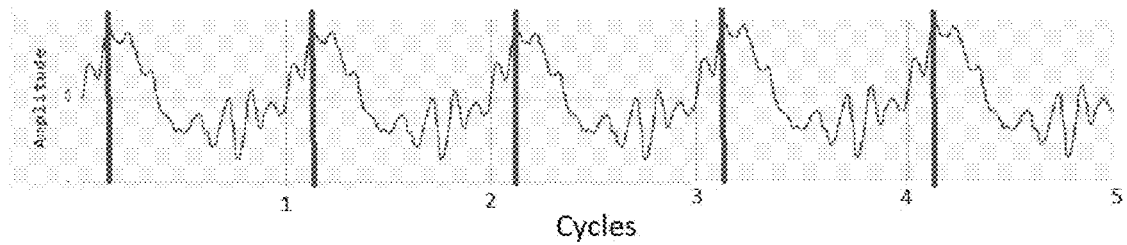
FIGURE 2
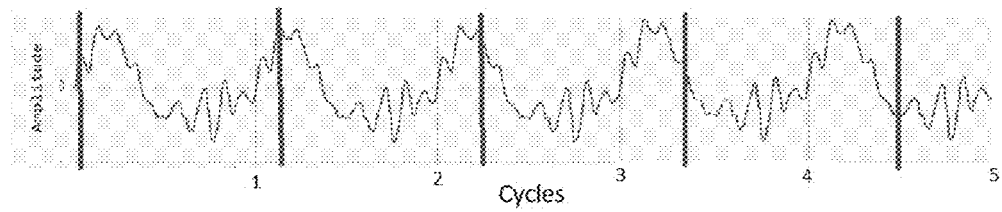
FIGURE 3A
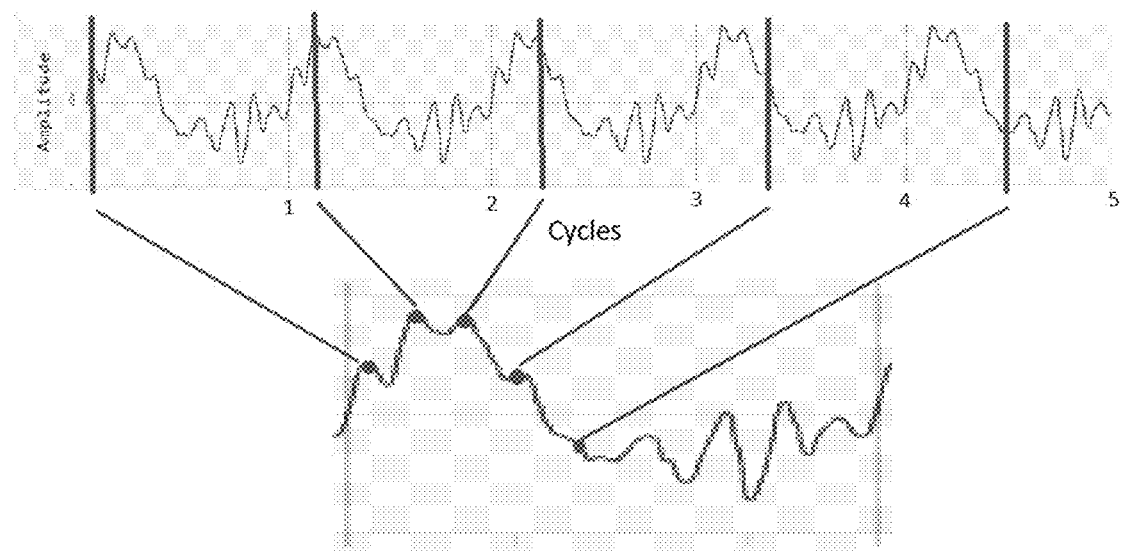
FIGURE 3B

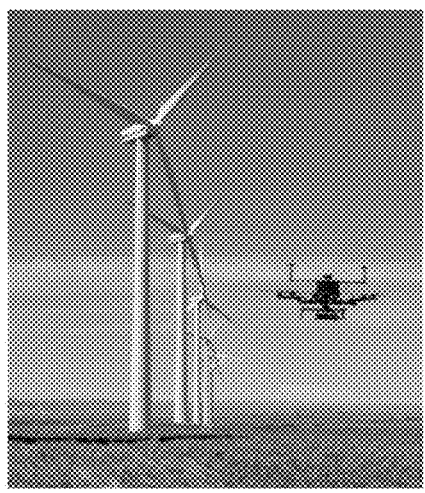 
FIGURE 7A
FIGURE 7B

100

112  110

IMAGE ACQUISITION AND DETAILED VISUAL INSPECTION OF COMPONENT IN PERIODIC MOTION

CROSS REFERENCE TO RELATED APPLICATIONS

This application is a continuation-in-part application of, and claims benefit of priority to, U.S. Nonprovisional Utility application Ser. No. 16/748,065, filed Jan. 21, 2020, which claimed the benefit of priority to U.S. Provisional Application No. 62/795,189 filed on Jan. 22, 2019, the contents of which are fully incorporated herein by reference.

FIELD OF INVENTION

The present embodiments pertain to systems, apparatuses, and methods for analyzing movements in machinery, machine components, and inanimate physical structures; processing of visual data related to such movements; and visual inspection of moving components by reconstructing video images that have enhanced frequency or angular resolution than could be achieved without the use of digital photography.

BACKGROUND

All machines and physical structures produce vibrations and resonances of various kinds, some of which may be characteristic of normal operation and others of which may indicate off-normal conditions, unusual wear, incipient failure, or other problems. In the field of predictive maintenance, the detection of vibrational signatures is a key element of the diagnostic process in which the goal is to identify and remedy incipient problems before a more serious event such as breakdown, failure, or service interruption occurs. Often it is desirable to visually inspect a mechanical component to determine if physical damage is present. This can be done by stopping the motion and performing a physical inspection; however, shutting equipment down and interrupting its operation to determine the presence of a fault condition or the extent of damage is undesirable.

One method that has been used to perform visual inspections while a machine is still in operation is by means of a stroboscope. This instrument flashes a high intensity light at user selected frequencies. When the frequency of flashing is exactly at the frequency of interest, the motion of the moving component appears to freeze. When the frequency of flashing differs slightly from the frequency of motion, then the component will appear to turn very slowly in a forward or backward direction. However, the stroboscope is limited by the perception of the human eye. Very slow frequencies are too intermittent to give a perception of stopping the motion because there is too large of a delay between the flashes. At very high frequencies, the flashes are so close together that the eye only sees a steady source of light and this prevents the motion from appearing to be frozen.

Since digitally captured data can be played back at any frequency which suits the perception capabilities of the human eye, it allows very slow or very fast frequencies to be rendered in a visually perceptive manner. Additionally, by selecting sample rates which are not synchronous with the frequency of interest, reconstructed video output can render what appears to be a very high angular resolution of the component which would normally only be achievable by cameras with a very high frame rate. When the frequency of interest is too high to be adequately characterized satisfactorily by the frame rate of the camera, the digital phenomena of aliasing still allows a video stream to be constructed that provides a very high detail examination of the component as it progresses through its cycle.

Also, whereas a stroboscope depends on the skill of the user to locate the correct frequency of motion and then to make the component turn slowly, by comparison a more preferred video system would only require the user to identify the object of interest by making a graphical selection from a single frame of the video. The system could automatically, and without variability that depends on user actions, determine the frequency of motion, calculate an optimum frame rate, set the shutter rate to the maximum or equivalently sets the brightness control or exposure time to the minimum value or sufficiently small enough value, collect the needed data, and reconstruct an output video which would enable a visual inspection of the component with very high resolution. Current embodiments are directed to providing this advantage with digital photography and video.

U.S. Pub. No. 2016/0217587 titled "Apparatus and Method for Analyzing Periodic Motions in Machinery" (Hay, Jeffrey R.; published Jul. 28, 2016), and later issued as U.S. Pat. No. 10,459,615, the contents of which are incorporated by reference herein, describes multiple embodiments that provide a non-contact vibration analysis system for machinery and structures. The embodiments described therein provide a number of features and advantages, not least among them is a flexible predictive maintenance tool that use vibrations to diagnose fault conditions using a video-based tool for evaluating the dynamic motions in machinery without the need for edge visualization or identification of other specific objects in the scene.

For example, the descriptions contained in US Pub. No. 2016/0217587 refer to multiple embodiments of a system for analyzing periodic (i.e., repeated) motions in machinery. This system comprises one or more video acquisition devices, such as but not limited to a video camera, positioned at a selected distance from a machine component or physical structure (i.e., object). This video acquisition device will be positioned with an unobstructed view of a selected portion of the object to obtain a video feed. This video, as is the case with the videos described in the present disclosure, is divisible into individual image frames, with each frame showing a static image of a scene, and with each frame being divisible into a plurality of pixels. This system further comprises a data analysis system, including a processor and memory to analyze the video file, such as by measuring a value which is characteristic of the object's physical movement over time to thereby determine the periodicity of that movement. The system in U.S. Pub. No. 2016/0217587 further comprises a data storage system to archive the video for later retrieval and comparison of the images and the measurements from the video, the image frames, or an enhanced version of the video. This comparison is the foundation for providing determining changes in the object's movement data, which may be indicative of mechanical anomalies.

In any such endeavor, however, it is important to understand that certain movements of interest by an object happen at such a high frequency as to not be discernible by a human observer with the naked eye or a person watching a video obtained from an actual scene with moving parts. For example, a vibration occurring in a machine component at 60 Hz, as an example, may need to be slowed down on video to discern what is actually happening with the component. With appropriate program instructions, the inventive system and methods disclosed herein may then be configured to compare spectrums for the two videos to see what peaks are shared. The shared peaks could be counted as normal behavior, whereas the peaks that are not common to the two spectra may be identified as changes in the vibration behavior, which may be associated with deteriorating conditions. Such approaches make the practice of the present embodiments more efficient and less prone to guess work.

Often, the conditions that indicate a problem or need for intervention that are captured by the video acquisition device are subtle ones that occur simultaneously with normal movements (i.e., substantially as designed and not a root cause or indicator of ongoing or future problems) of a machine or component. Consider a shaft that rotates as a normal movement, yet also has a vibration undiscernible to the naked eye that is accompanying this rotational movement. In this sense, the normal rotation of the shaft is not of concern, but one investigating the condition of the shaft would be interested in waveforms of each rotation from which the vibrational anomaly can be determined. Examples where visual inspection might be very helpful would include damaged or dirty blades, bent, bowed, or damaged shafts, and looseness or rubs. Accordingly, as discussed herein, the present embodiments efficiently and reliably achieve the objective of verifying specific fault conditions clearly based on a visual inspection based on recorded images acquired while the component is in normal operation.

In some settings, it likewise is beneficial to have an external trigger that can be used to control the acquisition of images with a camera to enable visualization and measurement of motions. The benefits include more precise imagery and reduced requirement for obtaining images manually.

SUMMARY

In an embodiment, after a user sets up a digital video camera to view the mechanical structure of interest, identifies the mechanical component to be inspected graphically from the image of the mechanical structure, the system identifies the dominant frequency of the component to be inspected (e.g., the periodic movement of a drive shaft), sets a desired frame rate, sets the shutter rate to the maximum or equivalently sets the brightness control or exposure time to the minimum value or sufficiently small enough value, and captures a video of minimum duration. As desired, a lighting check may be employed to recommend the need for additional external lighting. As described more fully herein, some embodiments provide a desirable feature through the use of multiple frequency spectra, in which a system automatically sets an acceptable sampling rate and duration to achieve the desired angular resolution based on the frequency of the periodic motion and the frame rates available in the camera, and the system automatically incorporates the use of aliasing as needed to obtain the optimum reconstructed video. Moreover, the system can be programmed so a user can override the automated selections as desired. Once the reconstructed video is available, the user can stop the motion playback of the mechanical component or slowly rotate through its periodic cycle to visually inspect all surfaces. As desired or needed, the original video can be stabilized to remove camera motion or filtered to remove other distracting motion. The reconstructed video can be played back at different rates and the motion can be looped and amplified to allow visualization of small motions such as shaft runout.

In one aspect of the inventive system and method, consider a shaft rotating or reciprocating at 30 Hz (30 repetitions every second). If the frame rate of the video camera is set at 30 frames per second, it would take one sample from each cycle of rotation or reciprocation at exactly the same angular or linear position on the shaft. If the video were played back to the user, the shaft would not appear to be moving. In order to prevent the 30 Hz frequency from aliasing in the recorded image the frame rate of the camera must be greater than two times the frequency of interest, in this case greater than 60 frames per second.

Now consider the situation that occurs if the video is recorded at 30.1 frames per second. The video frame captured at each rotation is at a slightly different angular location on the 30 Hz periodic motion of interest. During steady state operation, each frame captures the motion of the component at a slightly different angular location along the motion waveform. After collecting 10 seconds of data, 301 cycles of the 30 Hz motion are captured; and the full 360 degrees of the periodic waveform will be captured with a resolution of 300 samples (1.2 degrees of angular resolution). Without using the aliasing effect, this result would require a camera able to record with a frame rate of 9000 frames per second to achieve this result. But with present embodiments, once the video is captured and properly reconstructed, the component can be slowly rotated backward or forward through its motion to visually examine the component under the control of the user. This data may need to be filtered to remove motion that may be present at other frequencies, or to remove or normalize uneven illumination over the duration of the frames. Whether data is collected from applications with low frequencies of interest, for example less than 120 revolutions per minute (2 Hz) or from high frequencies, for example greater than 5400 revolutions per minute (90 Hz), this method will enable detailed evaluation of a single cycle of the motion of the component.

Accordingly, the result provides a high phase resolution even though the video camera used to acquire it has a limited frame rate, along with a modified playback rate adapted for improved visual inspection. Stated differently, the naked eye would not detect all the features when a single cycle happens in the span of 0.5 sec (30 Hz) with as much precision as if the cycle were slowed down to 150 seconds. In this regard, the limitations of the video camera operating at 30 frames per second approximate the same limitations of the human eye. However, even though acquired at a rate of 30 frames per second, aliased frequency enables playback to be slowed down so that very small features on the object being inspected can be discerned.

Additionally, the inventive system and method provide corollary features to assist a user. In some embodiments, a user is able to define an area of the machine or machine component from which to obtain aliased frequencies. This is accomplished by machine-readable program instructions that allow a user-controlled interface to define a region of interest on a monitor during video playback, appearing as a box around a particular area, portion or component of a machine to investigate. Subsequently, movements depicted in video as occurring in this region of interest are then processed as described herein. Examples of processing discussed in further detail herein include, without limitation, amplifying the movements in the video by differencing frames obtained in the video at two different times and multiplying the amplitude differences in those frames by a predetermined factor, rescaling, filtering out all frequencies except a subset of those frequencies identified in the region of interest from a frequency spectrum plot, or resampling the movement as an aliased frequency (e.g., changing from a sampling frequency of 60 Hz—i.e., 60 frames per second ("fps")—to a lower frequency such as 30 Hz). An example of these features to enhance the visual depictions in the processed video is found in US Pub. No. 2016/0300341 titled "Apparatus and Method for Visualizing Periodic Motions in Mechanical Components" (Hay, Jeffrey R. et al.; published Oct. 13, 2016), the contents of which are incorporated by reference herein. This application, now patented as U.S. Pat. No. 10,062,411, describes multiple embodiments in which a new image sequence or sequences are computed, showing the movements of an object(s) in motion being visually amplified.

Other options and alternatives within the scope of these embodiments include machine-readable program instructions that operably control a slider bar or a circular dial allowing a user to rotate the orientation of the shaft being evaluated in the video. For example, a first position on the slider bar (e.g., to the far left if the slider bar is horizontal, or at the bottom if the slider bar is vertical) might be used to indicate the absolute position of the shaft at origin. From there, a second, user-selectable position on the slider bar would match a position of the shaft at any given point in its cycle as shown in the video based on the movement over time, represented by the second position on the slider bar. As an alternative to a slider bar, one might configure a circular dial controllable by a user for selecting the point of the cycle that will be shown, where a point on the dial is designated as absolute position (i.e., beginning point in a cycle) and the number of degrees the dial is turned may reflect the progress of the object within its cycle of motion. Furthermore, this phase control mechanism can be manipulated by a user for positioning of the shaft or other object being evaluated during playback, for example to focus upon a particular moment of movement being evaluated at a certain point along the timeline. This in turn would be used to provide phase indication characteristics relative to the position of the shaft at particular times in the video.

Various embodiments disclosed herein may utilize different methods for capturing video sampling data comprising a plurality of video images of a moving object. In many cases, the cameras will be positioned on a stationary frame of reference adjacent to the mechanical component under investigation. However, other embodiments may utilize a camera attached to a drone in order to get video from the proper angle or from multiple units in an application such as a wind turbine farm. In such embodiments the data may require stabilization processing to remove the motion associated with the drone. Sometimes this also is necessary for stationary applications because of floor motion produced by nearby equipment in a facility.

In still other embodiments, an internal clock on the camera, a timed pulse, or an external trigger are used for image acquisition. For image acquisition according to the latter approach, an external trigger allows control over the camera to acquire the images, allowing for improved visualization and measurement of motions. As one example, a laser tachometer may be used as the input. The tachometer is connected to and in communication with the camera and configured so that when it senses an external stimulus upon the component of interest, it sends a pulse to the camera as a command to take an image. An external stimulus that is sensed and which acts as this trigger can be selected from a range of options known in the art, including items such as reflective tape or a keyway the tachometer is programmed to identify. When such a system obtains a series of images (one image per revolution), a video of the captured motion can be created. This video will show any motion that is a result of any component not coming back to its same position. A fan blade that comes back to the same position in each rotation or a rotating or reciprocating shaft are examples of components on which these embodiments can be used. With a fan blade, as one example, a laser tachometer may be positioned to sense the blade arriving at the original position, which sends a pulse to the camera to acquire a series of images with the blade in the same orientation. In still further embodiments, images are enhanced such as by detecting and amplifying or enlarging vibratory movements and other motion to visualize all the motion present as a result of components not coming back to their original locations.

BRIEF DESCRIPTION OF DRAWINGS

The patent or application file with respect to the present disclosure contains at least one drawing executed in color. Copies of this patent or patent application publication with color drawing(s) will be provided by the Office upon request and payment of the necessary fee.

The drawings, schematics, figures, and descriptions contained in this application are to be understood as illustrative of steps, structures, features and aspects of the present embodiments. Accordingly, the scope of embodiments is not limited to features, dimensions, scales, and arrangements shown in the figures.

FIG. 1 is a graph that shows a periodic waveform from a repeated cycle of movement of a moving object, having been obtained exactly at the frequency of repetition, and representing collected sampling data sampled from the same position in each cycle of the waveform, in which the sampled data may be collected by capturing visual images digitally.

FIG. 2 is a graph that shows the periodic waveform out of phase with the frequency of a repeated cycle of movement of the moving object, and represents collected data sampled from different positions in the waveform cycle, according to multiple embodiments and alternatives.

FIG. 3A is a graph that shows the periodic waveform likewise out of phase with the frequency of a repeated cycle of movement of the moving object, and represents collected data sampled from different positions in the waveform cycle, according to multiple embodiments and alternatives.

FIG. 3B is a reconstructed graph that provides a detailed view of the periodic waveform from aliased data collected on many cycles of the periodic motion waveform from FIG. 3A, according to multiple embodiments and alternatives.

FIGS. 7A and 7B are photographs that offer perspective views of one or more wind turbines with acquisition of video images collected with drones, according to multiple embodiments and alternatives described herein.

MULTIPLE EMBODIMENTS AND ALTERNATIVES

Figure 4A:
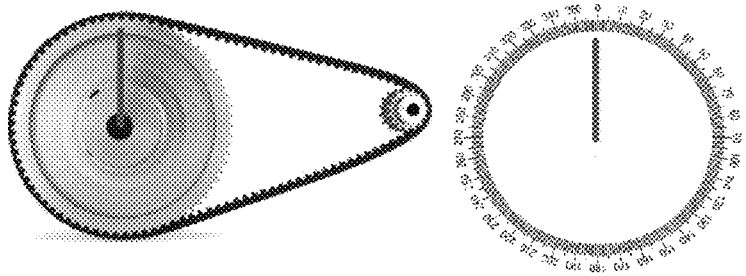
FIGS. 4A-4E offer schematic views representing damage to a tooth on a belt-pulley component at different angular positions, as an illustration of a condition which can be detected through the practice of multiple embodiments and alternatives described herein.
Figure 4B:
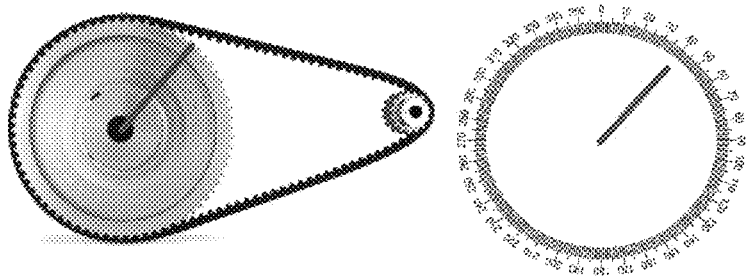
Figure 4C:
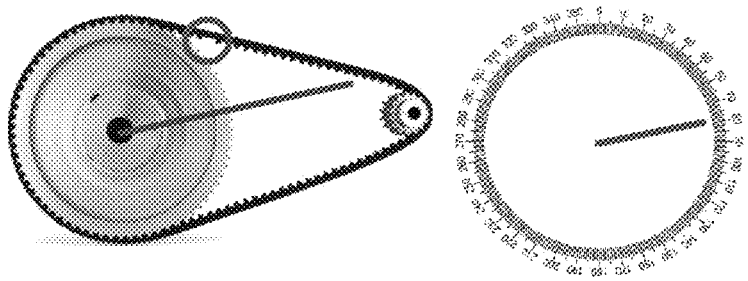
Figure 4D:
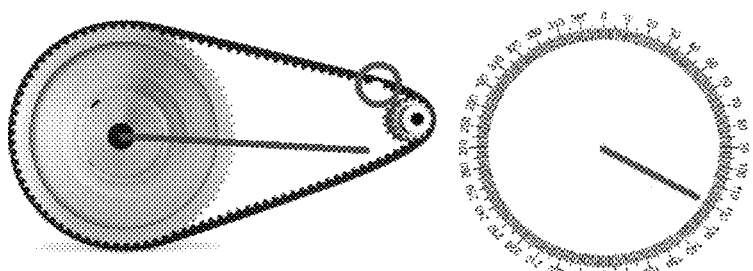
Figure 4E:
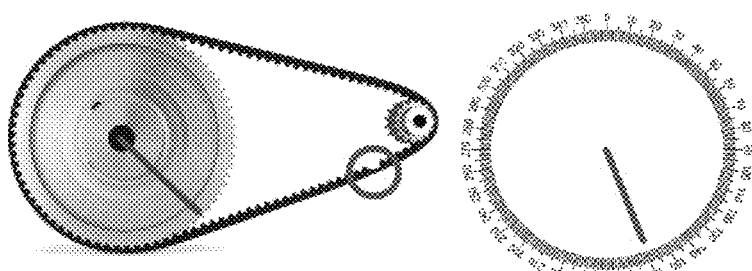

Embodiments described herein provide an improved manner of diagnosing the conditions of machinery and other moving objects by the detection of vibrational signatures. The detailed evaluation of a cycle of motion for such objects is able to approximate the resolution that would be obtained with much more expensive equipment marked by a frame rate acquisition capability that is unavailable in most commercially available cameras or very expensive and largely cost prohibitive where such capability might exist. The following descriptions are directed to the main aspects of this novel capability as well as corollary features that include, without limitation, the capability to focus on a specific region of interest depicted in the frame, freeze its motion or track it with very high definition through it cycle of repetition and, optionally, other processing enhancements such as detecting and amplifying vibratory or other movements, filter frequency, phase indicators, and control of the object's placement within a cycle of motion.

In an exemplary embodiment, a system is provided which evaluates a moving object undergoing periodic motion, with the use of at least one video acquisition device (e.g., video camera) that acquires video images of the moving object. The frame rate on the video camera can be adjusted, allowing video images to be acquired at a frequency that is asynchronous with the frequency of movement of the object as it undergoes periodic motion, i.e., cycles of motion that can be reciprocating, rotational, elliptical, parabolic, and so forth. The sampling rate may not be fast enough to prevent the frequency of interest from appearing in the data as an aliased frequency and in this case, the acquisition rate is normally set slightly higher or lower than the frequency of interest so that one sample per cycle of motion is acquired. Alternatively, faster sampling rates (about twice the frequency of interest, for example) also can be used which will result in multiple samples being acquired on each cycle of repetition and reducing the total acquisition time required. The system further comprises a processor and a memory, the latter for storing images that are acquired and modified, and the former for operating a computer program suitable that executes a number of computer functions described herein. In some embodiments, the computer program operates to isolate video image frames collected over multiple cycles and reconfigure those into a modified video that represents one cycle of motion. Each of the video image frames represents a portion of the source video corresponding to a specific position in the cycle of movement of the object.

Aliased Slow Mode Acquisition

In some embodiments of the present disclosure, system features described herein enable a user to select a frame rate that is asynchronous with a frequency of interest. For example, consider a shaft that normally rotates at 20 Hz (20 cycles per second). The user may set the frame rate to 20.1 Hz, and the data that is acquired includes an aliased frequency of 0.1 Hz as a subset of the 20 Hz motion. Through a series of aliased frequencies obtained in this way, a user collects data to characterize the 20 Hz motion in a motion amplified data set. Although the actual time to complete a cycle takes 0.05 seconds, the system would need to collect 360 cycles of data to achieve a one-degree resolution in the reconstructed video. This would require the system to collect 18 seconds worth of data. The reconstructed video produced according to present embodiments would present one cycle of the shaft, or loop this cycle, at any playback speed which facilitates visual inspection including individual frames at any selected angle in the shaft rotation. Additionally, in some embodiments the system will have stabilized the original video to remove camera motion, filtered the video to remove frequencies not of interest to this inspection, or amplify the motion present in the shaft to allow the motion to be perceptible to the human eye. In some embodiments, the system is configured so a user can select one or more spatial regions where amplification is to occur, or alternatively where amplification is to be suppressed while the non-selected region is amplified.

In order to capture this data without the aid of the aliasing phenomena described herein, the camera would have needed to sample the shaft at 7200 frames per second. This frame rate is well above what is available for most cameras that are suitable for use in industrial applications and, if such high-performance cameras were available, they would add significant cost to the inspection system. As described herein, when inspecting mechanical components with a high frequency of periodic motion, a complete cycle with high angular resolution could not be reconstructed without the use of the aliased frequencies. In this case, a user may filter captured video data to only include frequencies very close to 0.1 Hz in order to present the movement at these aliased frequencies without any contribution from other frequencies.

FIG. 1 illustrates the result of sampling a periodic waveform (graphing the amplitude of motion in repeated cycles) of a moving object exactly at the frequency of repetition of the mechanical component under investigation. Sampling the periodic waveform at some integer multiple of the frequency of repetition creates the same effect. In this circumstance, each sample is collected from the same position(s) in each cycle of the waveform. No matter how video frames data are acquired, the same angular positions are sampled from each cycle and no new information is gained by sampling multiple cycles of the mechanical component. FIG. 2 and FIG. 3A show the effect of sampling a periodic waveform asynchronously to the frequency of repetition. In this case, samples are acquired from different angular position(s) in each cycle of the waveform. In this case, the video frames captured from each cycle provides new information about the mechanical component. FIG. 3B, a graph extracted from a periodic waveform obtained by under-sampling in which the aliased frequencies were collected at a frequency different from the frequency by which the component completes each cycle, illustrates how the samples from multiple cycles can be repositioned into one cycle with greater angular detail. The same principles would also apply for a reciprocating object or piece of machinery as it cycles through its motions. Similarly, the video frames captured asynchronously to the periodic motion being investigated can be reconstructed into a video providing extremely high angular resolution of the mechanical component as it goes through one cycle of motion. This method of reconstructing a video sequence allows visual inspections to be performed without disrupting the operation of the machine which would otherwise not be possible.

An exemplary use of the inventive method may be as part of a shaft inspection tool. As frames are reconstructed and recombined from many cycles of operation, the video will display greater angular detail as more cycles of video are recorded. Previously, an example was described of a 0.1 Hz aliased frequency, but many other aliased frequencies are well within the scope of present embodiments. In all cases, the resulting video will enable the user to present a complete high phase resolution video of one or more periods of the motion of the mechanical component despite any limitations with respect to the frame rate of the camera as compared to the frequency of the periodic motion to be examined.

Other uses of the inventive aspects described herein are shown in several figures. For example, FIGS. 4A-E illustrate how this approach could be used to investigate a belt-pulley system on a machine. In these figures, a missing tooth from the belt is very apparent at locations when the belt is not in contact with a pulley wheel. Although for all practical purposes the belt cannot be inspected while the machine is in operation due to the speed of operation, the video inspection system described in these embodiments could, as further described herein isolate the frequency of the belt as distinguished from the rotational frequency of each sheave pulley; select an appropriate sampling rate for analyzing the belt; and acquire an appropriate number of cycles of rotation. The reconstructed video could then freeze the motion of the belt, or loop one cycle of the belt rotation repeatedly at the measured amplitudes or with the motion amplified at any playback speed selected by the user. In addition, the motion can be frozen, and the user can select views at any angular location in order to do a detailed visual inspection of the belt.

Figure 5A:
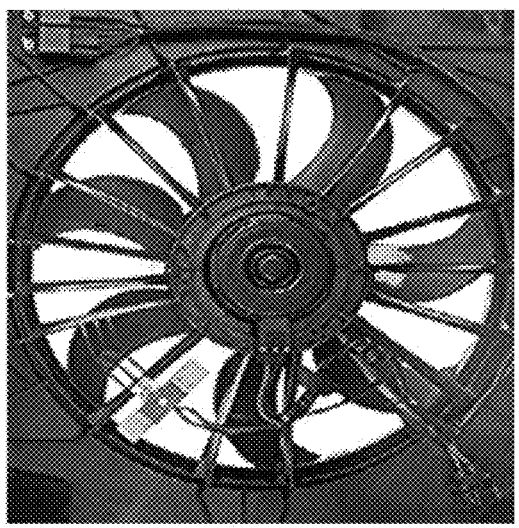
FIGS. 5A and 5B are photographs depicting damage to a first ventilation fan and a second ventilation fan, respectively, as an illustration of conditions which can be detected through the practice of multiple embodiments and alternatives described herein.
Figure 5B:
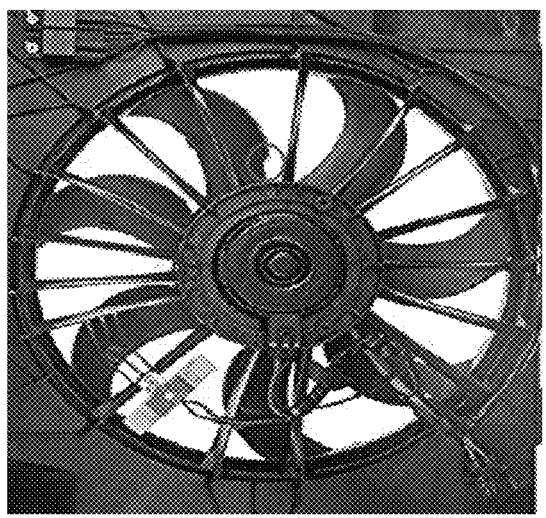

In FIGS. 5A and 5B, the ventilation fans have experienced damage that could not be seen with the fans in operation. FIG. 5A depicts a fan in a frozen condition where the damage due to rust can be seen on the blade around the angular position of 90 degrees (3:00 on a clock face) although partially obscured by a support structure, and FIG. 5B depicts the fan in a damaged condition in which the eroded blade is easily visible as noted by a circle near angular position zero degrees (12:00 on a clock face). Such are examples of conditions that can be detected and analyzed by the practice of embodiments provided herein.

Figure 6:
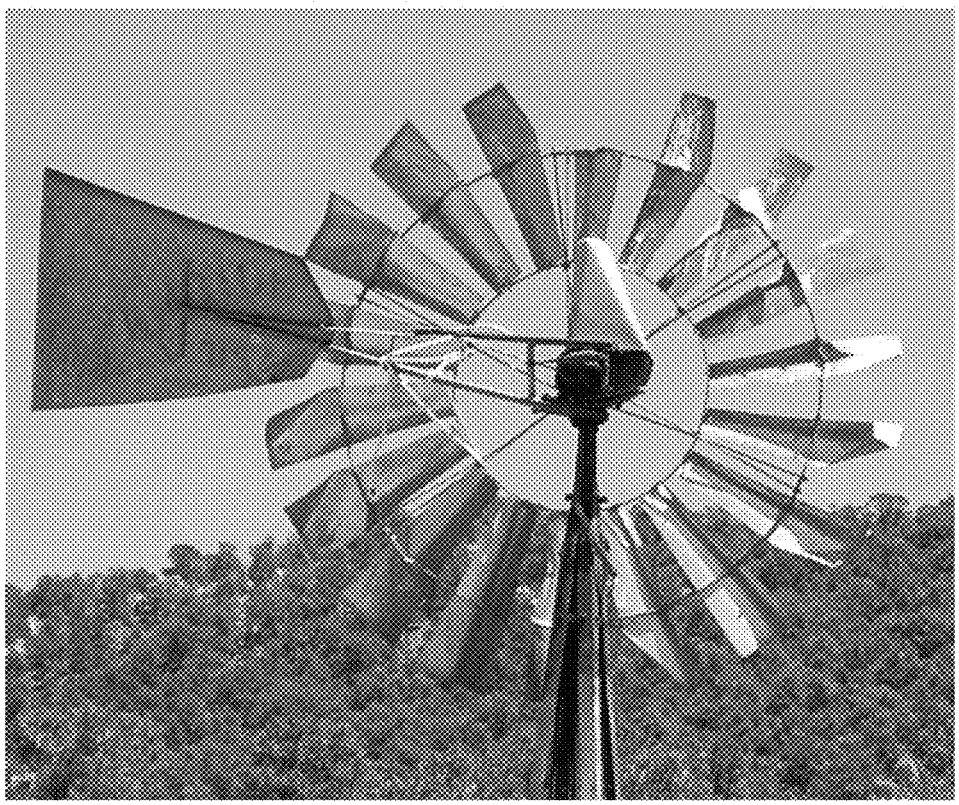
FIG. 6 is a single frame from the reconstructed video of a windmill with multiple damaged blades, as an illustration of a condition which can be detected through the practice of multiple embodiments and alternatives described herein.
Figure 8:
FIG. 8 is a photograph of a blade with ice accumulation on the turbine blades that would be very difficult to evaluate in operation, yet visible with reconstructed video images that enable more detailed visual inspection during normal turbine operation, in accordance with multiple embodiments and alternatives described herein.

Likewise, FIG. 6 is a single frame from the reconstructed video of a windmill with multiple damaged blades. Again, this illustrates a condition which can be detected through the practice of present embodiments. Even though the presence of some damage could be seen when the windmill was turning at slow speeds, the full extent of the damage could not be assessed during operation to the extent provided through the practice of the present embodiments. In like manner, conditions associated with the wind turbines in FIGS. 7A-7B and the ice accumulation on the blade in FIG. 8 can be evaluated and diagnosed prior to failure, using the systems and methods herein. Although the camera may need to be mounted on a drone to gain an advantageous perspective of the wind turbine, the ability to perform detailed blade inspections during normal operations could not be accomplished without the use of embodiments such as those described herein.

In some embodiments, a user may select a low exposure time to limit the amount of motion blur. The system may do this automatically. The system may adjust the settings of the camera automatically so that they are appropriate for inspecting a shaft requiring a small exposure time. The system may automatically determine the speed of the shaft, and automatically set the frame rate of the camera appropriately so that it is slightly off the rate of the shaft to produce the aliased frequency as discussed herein. In the above example, once the of 20 Hz motion of interest has been specified or measured by any means known in the art, the system will automatically select a frame rate of the camera, or this can be set by the user to a value suitable for producing an aliased frequency, such as 20.1 fps to produce a 0.1 Hz aliased frequency, or a 30.2 fps to produce a 0.2 Hz aliased frequency, as non-limiting examples. The signal could also be sampled asynchronously at frame rate of 100.1 Hz without aliasing and capture 5 points on each period of the 20 Hz signal of interest. In this case, the system would only need to collect about 3.5 seconds or 72 cycles of data to achieve one degree of angular resolution. The faster sampling rate works well and reduces data acquisition time if the system is operating in a very stable manner but gives less satisfactory results if there is some variation from cycle to cycle of operation.

While present embodiments are not limited to any specific sampling rate, in some cases a sampling rate may depend on and be determined by user preference for resolution between image frames being acquired and repositioned in a reconstructed (i.e., modified) video. For example, "Freq" means the frequency of a given periodic motion of interest expressed in Hz; "N" means a number of samples to acquire per cycle of motion; "Resolution" refers to a desired angular resolution in a reconstructed period of motion of an object expressed in degrees; "ΔRev" defines the resolution expressed as a fraction of a revolution. With the foregoing meanings, the equations for determining a sampling rate, SampleRate, expressed in units of frames per second are given below:

$$\Delta Rev = Resolution/360$$

$$SampleRate = N*Freq*(1+\Delta Rev)$$

The value of N could be established by the user or set automatically by the processor to obtain the highest possible sampling rate available from the camera and minimize the total sampling interval required to achieve the specified resolution in the reconstructed cycle of repetition.

Figure 9A:
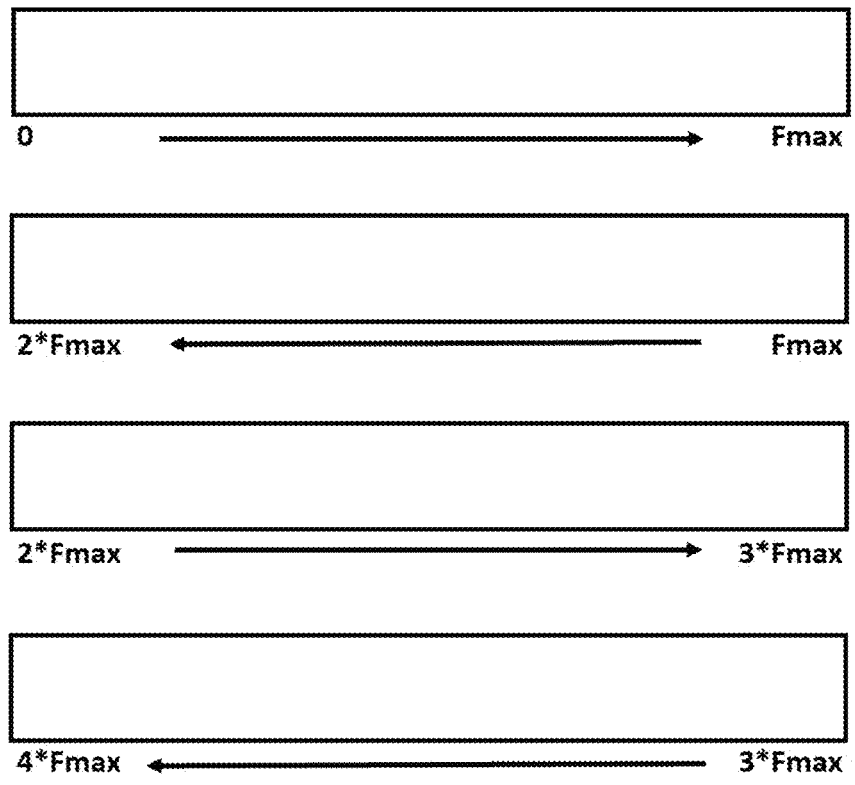
FIG. 9A and FIG. 9B provide an illustration of an aliasing effect resulting from digital data captured at different sampling rates, according to multiple embodiments and alternatives.
Figure 9B:
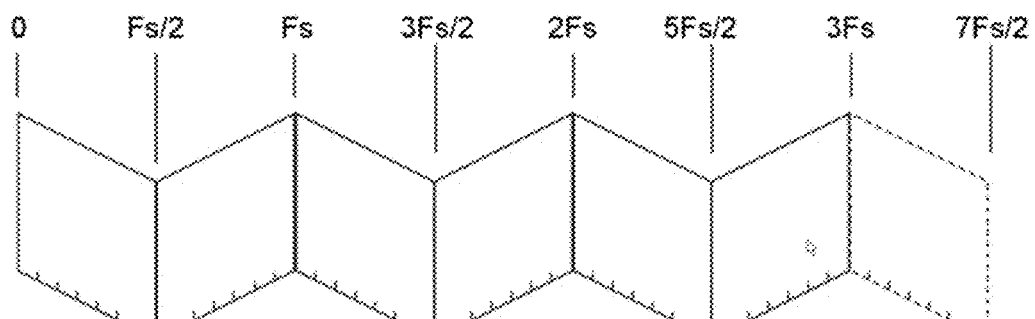

FIGS. 9A-B and Table 1 below illustrate the phenomena of aliasing which occurs when sampling data. Here, the aliasing effect results from digital data captured at different sampling rates. Aliasing is generally prevented when digitally processing signals by applying analog filters to remove the higher frequencies that would be aliased, to prevent these frequencies from being folded into the lower frequency data. An equation which can be used to determine location of the aliased frequency into the range of the digitally sampled data is $FR=TF/F_{max}$, where TF is the true frequency, FR is the frequency ratio, and $F_{max}$ is the maximum frequency in the frequency spectrum such that $F_{max}$=0.5 times the Sample Rate (or Frame Rate).

When the form of FR is viewed as a whole number (N) plus a fraction (Frac), FR=N.Frac, then the aliased frequency (AF) can be calculated using the following formulas:

If N is Odd, then AF=Fmax−Frac*Fmax
If N is even, then AF=Frac*Fmax

By way of further exemplary illustration, Table 1 provides the different aliased frequencies which occur for a sine wave of 384 Hz when sampled at less than two times this value.

TABLE 1

Table of aliased frequencies when measuring a 384 Hz motion of interest resulting from various frame rates:

| Frames per second | $F_{max}$ Frequency (Hz) | Aliased Frequency (Hz) |
|---|---|---|
| 100 | 50 | 16.0 |
| 120 | 60 | 24.0 |
| 200 | 100 | 16.0 |
| 300 | 150 | 84.0 |
| 400 | 200 | 16.5 |
| 500 | 250 | 116.5 |

Reconstruction of Frames

In some embodiments, a user selects a frame rate slightly off from the periodic motion of a machine or component undergoing movement at a frequency of interest. That sampling frequency may be asynchronous (out of phase) with the vibration or motion of interest. To illustrate in non-limiting fashion, the frame rate might be 3% higher or lower than the actual frequency of rotation. For example, if the machine has a shaft rotating at 30 Hz, the camera may record images at 30.1 frames per second, or "fps" (30.1 Hz), referred to herein as an aliased sampling rate (ASR) frequency. An ASR frequency may be selected by a user, or automatically set by the system. An ASR frequency may be greater or less than the actual frequency of the moving object. For example, in some embodiments, an ASR frequency which is 1 Hz or less different than the actual frequency of the moving object may be suitable. At higher frequencies, a difference of 10 Hz may also be suitable, or in some cases the difference between an ASR frequency and the actual frequency may be in tenths of a Hz. The result is the camera will sample different locations on the rotating or reciprocating component; this results in the sampling of different positions on the waveforms for each cycle, as illustrated in FIG. 2. This may be used to sample frequencies much higher than can normally be achieved by the camera. This method may be beneficial when the machine is operating at a steady state and the motion of the machine component or vibration do not change.

The fact that the camera keeps sampling at different angular positions of the periodic signal will allow the software to capture enough images over time that each angular position of the periodic signal can be represented in the video, as illustrated in FIGS. 3A-B. In this manner, a camera may acquire data for a sufficient time to reconstruct a full waveform or periodic event (seen in the video in this case). For example, in the first pass of the periodic signal the camera may acquire an image in the periodic signal that represents the 10th degree position of 360 degrees. Then the next pass at the periodic signal may enable the camera to capture the 15th degree. This would keep occurring for 72 cycles of the motion (360/5=72), then the video is reconstructed to show one periodic signal that is really comprised of images from frames selected from multiple cycles of the signals. This allows the camera to achieve a much higher resolution video as well as faster vibrations than can normally be achieved by a camera.

As previously noted, various forms of image processing are within the scope of the present embodiments, e.g., amplification or rescaling. Another capability involves recording a moving piece of equipment, for example a shaft rotating at 30 Hz, to return a high-resolution video of the motion with high angular resolution. To further illustrate, in a shaft rotating or reciprocating at 30 Hz, if acquisition was done by setting the framerate of the camera at 30.1 Hz, one would slowly acquire a series of videos separated by 33.33 milliseconds (1.0/30.1) in time. For the 30 Hz periodic motion of interest, the system could acquire video data over 301 cycles in 10 seconds, providing a resolution of 1.2 degrees in the single cycle presented in the reconstructed video. Reconstructing the full or substantially full waveform in this manner would allow reconstruction of 30 Hz waveforms providing full or near full imaging of the motion in the scene.

It will be appreciated that the methods described here will result in many frames, in the video content acquired over many cycles of the periodic motion of interest. In the previous example, 1 image per cycle was stored (representing the aliased frequency), but by keeping all the acquired images and assigning them to a particular phase of rotation, such as in the example of a rotating shaft, the system is able to reconstruct one cycle in the appropriate order by filling in gaps of the shaft's position as new images are acquired. Once every phase of the rotation is represented (depending on desired resolution), the acquisition can be stopped. Sampled frames are assigned phase values based on the time at which the frames are acquired. If the frequency of the periodic motion of interest is known, and the elapsed time for acquiring each frame is known, then the phase position for each frame in its respective cycle of motion can be calculated or determined.

Automatic Frame Rate Determination

A problem that exists with currently available methods is the need for the user to set the frame rate for capturing the video images. For a user who may lack complete knowledge of signal processing or the current operational state of the machine, this may result in under-sampling, as well as lost efficiency through laborious trial and error as the user attempts to determine an appropriate frame rate on the camera.

Another embodiment which may allow a user with less skill to obtain the desired results also requires the acquisition of two separate videos. In a first acquisition, the camera is set to its highest frame rate for the visual field selected or at least 2.0 times the highest frequency of interest. When the frequency for the motion of interest is determined as a result of being selected by the user from a frequency spectrum, the system automatically determines the best sampling rate (or a suitable sampling rate) and the collection duration for capturing the second video recording to provide visual inspection of the mechanical component.

Further, as data about a machine or machine component is gathered, a user may be aided by knowing/determining the frequency of interest ahead of time from some other external measurement such as a tachometer and having a steady state condition during acquisition. Accordingly, in some embodiments a user may enter the value of the rate of rotation or reciprocation of the component of interest, and the system automatically determines the best sampling rate (or a suitable sampling rate) and the collection duration for capturing the video recording to provide visual inspection of the mechanical component with a desired degree of angular resolution.

Control of Image Acquisition

In some embodiments, a device is used to produce a trigger that causes the camera to obtain each image in a series of images. As a non-limiting example, a laser tachometer may be used as the input such that it produces a trigger each time a rotating shaft rotates to the same angular position the laser sensing a reflective marker or keyway on the shaft. When the laser tachometer senses an external trigger, e.g. reflective tape or keyway, it sends a pulse to the camera which acts as a command to take an image. In this scenario, the rotating shaft will come back to the same angular orientation in each revolution. In an exemplary use case, the camera is set to a small acquisition time to enable a sharp image. In accordance with the teachings herein, a series of images acquired one per revolution can be combined to create a video, which shows motion that is a result of a component of interest not coming back to its same position. Again, by way of non-limiting example, if all motion is vibration which is harmonically related to the running speed, then the rotating element will appear perfectly frozen in a still position. However, when other vibrations which are not harmonically related to the shaft are present, then the shaft will exhibit this motion. Mathematically this motion can be submitted to one or more additional processes that amplify, enlarge or magnify the appearance of motion to make it more discernible to the user. In some cases, if the rotation occurs at a constant rate, a timed pulse may be substituted as an input.

Another example may be a fan blade that comes back to the same position in each rotation. As one example, using similar principles as described for a shaft, one of the fan blades may be marked as described herein (e.g., reflective tape) so that as the laser tachometer senses that blade arriving at the original position, it will prompt the camera to obtain a series of images with the blade in the same orientation each time.

Techniques such as amplifying the motion may be employed to visualize all the motion present that is due to the components not coming back to their original locations. This will help visualize all nonsynchronous motion such as torsional measurements on a shaft or fan blade vibrations. Additionally, measurements of motions may be made with from the video imagery frame to frame to demonstrate motion that is nonsynchronous. It will be appreciated that any number of measurement methods may be employed, example include but are not limited to, edge tracking, feature tracking, template matching, or optical flow. In the situation of a rotating shaft, for example, two measurements at different locations on the shaft may not be the same. One location may overshoot the equilibrium position while another may undershoot. This delta will give the torsional variation of the shaft.

An external trigger in the form of a timed pulse may also be used to offer a slightly detuned value of the shaft, resulting in the camera firing off at a slightly different phase per revolution giving the effect of making the rotating object seem to rotate slowly. At this point, software providing machine-readable program instructions may be used to make a high resolution (in-phase) measurement of the rotating object and apply techniques such as MOTION AMPLIFICATION® for a better visualization of the rotating component. An exemplary system and method for providing such enhancements is set forth in US Pub. No. 2016/0300341, previously identified herein and incorporated by reference.

It will be appreciated that any number of external devices may be used as a triggering device that trigger at a particular phase of the shaft or blade rotation, examples include, but are not necessarily limited to, optical sensors, proximity sensors, or high-speed cameras.

A motor turning at a rate of 1800 rpm or 30 Hz will serve as an example. The speed and frequency means the shaft will return to its original position 30 times in 1 second. Many conventional cameras, other than ones whose cost is much greater and potentially prohibitive, do not have the precision to accurately synchronize with this rotation. A common method of determining accurate position on a shaft is with a laser tachometer or photo tachometer. These devices are configured to sense a discontinuity of the received signal. For example, in a machine having a rotating shaft with a keyway formed in the surface of the shaft, a laser tachometer may be pointed at the shaft and each time the keyway interrupts the signal, the laser tachometer senses this and sends a pulse indicating that position on the shaft has returned to the same spot. Another optional approach is to place reflective tape on the shaft so that the laser can sense the change in signal due to the tape reflecting more signal. In other example use cases, known areas containing non-uniformities on the shaft may produce such a change in signal sufficient to trigger an optical or proximity sensor. The result is a pulsed signal that always triggers exactly at the same physical location on the shaft during each revolution. If one keyway or piece of reflective tape is used, then this occurs once per revolution. Alternatively, if more than one piece of reflective tape is used, then the signal is sent from the laser tachometer each time the reflective tape passes under the laser beam.

Another way of triggering the once per revolution or N position events of a shaft may be by the use of a camera itself. If the camera is operated at a high frame rate and sends an external trigger to one or more other cameras when a certain pixel or set of pixels senses a change in signal, the camera could effectively be used as a trigger.

Still another example would be a photodiode or set of photodiodes set to trigger when they sense a change in the light level due to reflective tape, keyways or some other discontinuities on the shaft.

Figure 12:
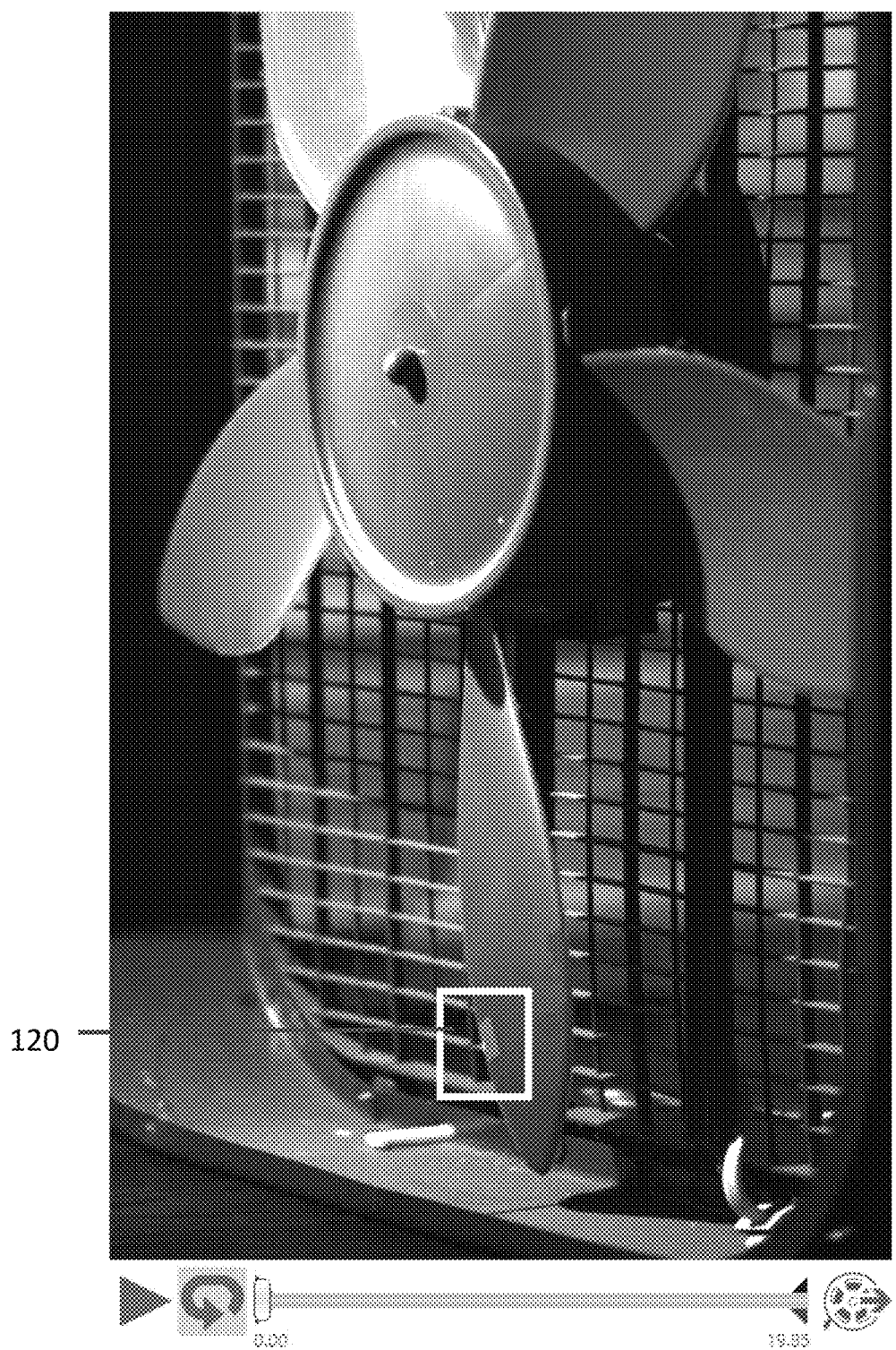
FIG. 12 is a photograph of a fan blade with an area marked with reflective tape, associated with illustrating an example use of multiple embodiments and alternatives.

The teachings herein can also be used to assess the motion of a fan blade. A laser tachometer or photo tachometer are examples of external triggers used to sense the return of a fan blade to its same position. In this case a piece of reflective tape 120 may be positioned on one or more blades, such as shown in FIG. 12, such that the tachometer, photodiode, camera, or other sensing device senses the change in signal when the reflective tape comes into view of the triggering device. In this situation the result would be a signal generated every time the blade or blades return to the original position.

In a system in accordance with present embodiments that is configured to enlarge, amplify, or magnify the appearance of machine vibrations and movement, videos are recorded at the shaft or fan blade being at the same rotational position during each frame. Again, this arrangement allows all motions that do not return to a precise exact location at each revolution to be detected and visualized. Examples of such anomalous motion may be blade flutter, torsional vibration in a shaft or any other nonsynchronous motion.

Optical displacement measurements may also be made to quantify these movements. As desired, data may also be filtered to show individual or bands of frequencies of vibrations. U.S. application Ser. No. 16/009,749, "Monitoring of objects based on frequency spectrum of motion and frequency filtering" filed Jun. 15, 2018, describes such a filtering regimen. The entire contents of application Ser. No. 16/009,749, are fully incorporated by reference herein. Applying these techniques, frequencies of interest can be made to appear in the spectral data, but with aliased frequency(-ies) values.

This may also be applied to non-rotating pieces of equipment, such as but not limited to reciprocating equipment. Each time the reciprocating component comes back to the original position the camera may trigger to capture an image essentially freezing the motion. Visualization tools to amplify or enlarge the appearance of motion in the video would now show all motions nonsynchronous to the reciprocating component.

Another illustrative instance of use may be to create N separate videos where N matches the number of fan blades, each marked with reflective tape, where each video is created from frames where a blade is at the same position each time. As one example, if a fan has 5 blades such as depicted in FIG. 12, 5 videos would be created where each time the first video has blade 1 at 0 degrees phase (i.e., equilibrium), the second video has blade 2 at 0 degrees phase each time and so on.

A tachometer or similar device that sends a signal once per revolution or when a particular feature comes into view will trigger an event such as firing a camera when the rotating equipment reaches the exact location in rotation each time. an alternative scenario is using a timing device to trigger a camera. In this situation the shaft rotation speed can be input into the timing device. The device would then pulse or trigger at the exact same rate with the rotation essentially triggering the camera each time the shaft reaches the same orientation. In this situation the shaft would need to be at the exact rate as the external triggering device.

In another alternative embodiment, the external triggering device may be adjusted to be slightly detuned from the shaft. For example, if the shaft is rotating at 30 Hz and the external trigger is set to 30.1 Hz, the result is the shaft will appear to move at 0.1 Hz, due to the fact that when the shaft comes back around, instead of triggering at 1/30 of a second later, the camera triggers 1/30.1 seconds later or approximately 0.00011 seconds later, allowing the shaft to rotate slightly more than 1 rotation. Accordingly, it will be appreciated that detuning the camera acquisition rate slightly off the rate of the camera to get a higher apparent rate of capture on the shaft could offer substantially similar functionality as a high-speed camera. This can have the benefit of applying techniques to amplify, enlarge or magnify the appearance of motion due to the fact that the shaft appears to be only slightly moving so there may be less smearing in the video and appear more fluid. It also can help in making optical displacement reading on the shaft since features in the shaft which are visible longer do not move as far and move slower making tracking easier to do. It further will be appreciated that the external clock could be substituted for an internal clock in the camera in various embodiments herein.

A specific case of measurement may be for the purpose of measuring torsional motions on a shaft. In this example the laser tachometer or other rotational tracking device may be used. The laser tachometer would be attached to the camera in such a manner that the laser triggers a camera acquisition exactly once per revolutions. Reflective tape or a keyway may be used to precisely trigger the camera such that the shaft is in the exact same position each time. The camera would be turned on and await a signal from the tachometer to begin acquiring frames. The tachometer would be positioned at the shaft and trigger each time the reflective tape passes under the laser beam. A series of images would be acquired of the shaft at the exact same location. Even though the tachometer triggers the camera to take a picture of the shaft at the same location each time as the reflective tape reaches the same location, still there will be other areas of the shaft whose location may vary relative to the location of the tape from one time to the next time the tape passes and triggers the camera.

Stated differently, and by way of examples with respect to the numbers used, if the reflective tape is considered to reach the laser tachometer at a phase angle of 10 degrees, an area to the right of the shaft, and aligned in its position at the same angle as the reflective tape when the shaft is stationary, may be at 11 degrees and such an area to the left may be at 9 degrees while in operation. Then in the next frame an area considered to be at the same angle as the reflective tape when the shaft is stationary to the right of the shaft may be at 9 degrees and an area to the left at 11 degrees. This observation indicates that the shaft likely is undergoing torsional vibration.

Figure 10:
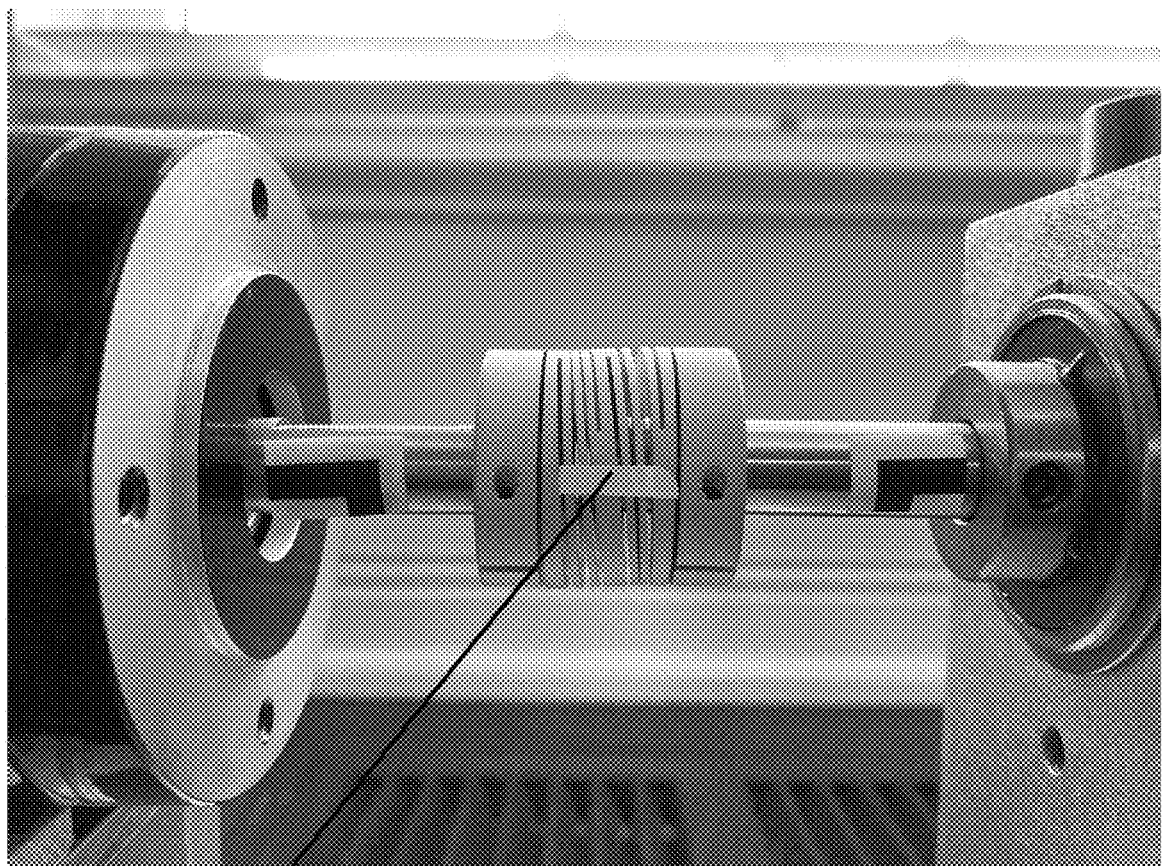
FIG. 10 is a photograph of a rotating shaft with reflective tape, associated with illustrating an example use of multiple embodiments and alternatives.
Figure 11:
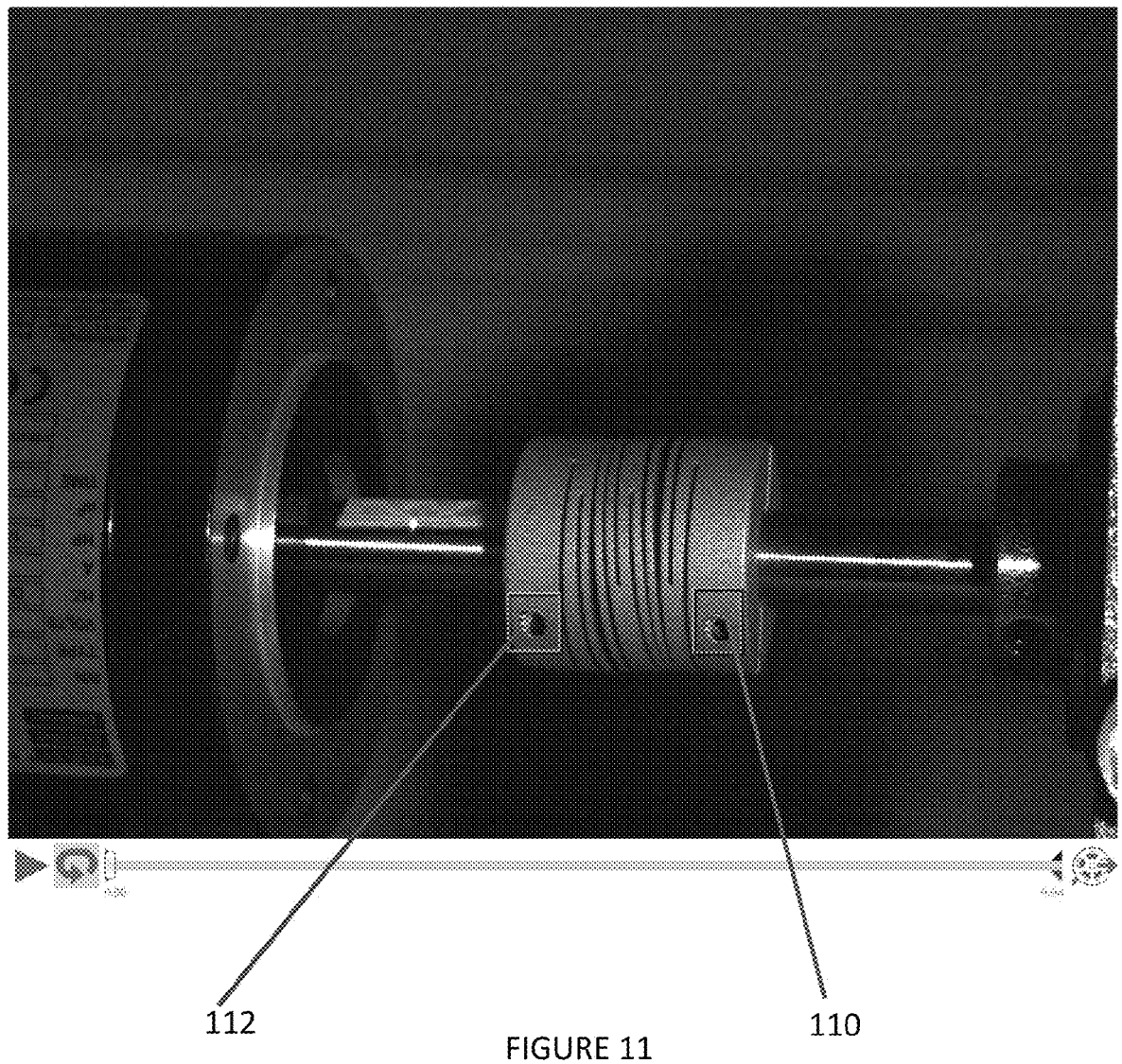
FIG. 11 is a photograph of a rotating shaft with setscrews serving as markings and designated as right and left areas, associated with illustrating an example use of multiple embodiments and alternatives.

In an exemplary use, markers are placed upon the right side and the left side of a horizontally oriented shaft. As shown in FIG. 11, the markers are respective setscrews positioned on the right (110) and left (112) of the coupling, which is oriented so the shaft remains horizontal while it rotates. Alternatively, if the shaft were oriented so it remains vertical while it rotates, the markers would be positioned relative to top and bottom areas of the coupling. Alternatively, as shown in FIG. 10, one marker such as reflective tape 100 is positioned on a shaft lengthwise. The setup described here allows for the locations to be measured through the video to create a waveform of their vertical movement. These waveforms can be compared to see variation to determine the difference which indicates how much more or less once area of the shaft is moving in terms of rotation. A Fourier transform or similar process can be performed on the waveforms to determine the frequency. A delta of the two waveforms can be used to determine the amount of torsional motions. The parameters of the shaft such as radius material and length could then be used to determine strain or stress on the shaft.

The tachometer output could be connected to a phase lock loop circuit to create a multiple of a trigger frequency, such as 6×, that could be used to trigger camera acquisition and track the rotation during transient conditions, such as a period when the speed is varying. Despite the fact that the shaft speed is changing, it will trigger the camera six times per revolution, thus capturing six images in the video per revolution throughout the transient conditions. Time synchronous averaging could then be applied to the images by co-adding the same indexed frame of each video to eliminate noise and show only synchronous motion related to the rotation event.

The tachometer may also be used to track the rotation during a coast down or start up. Despite the fact that the shaft speed is changing it will trigger the camera when the shaft reaches the same rotational orientation creating one image in the video per revolution through an entire startup or coast down. The result will be all the motion present from components not returning to the original positions. Transients and excessive vibrations at particular frequencies or due to a particular turning speed will easily be seen especially when processes through a motion amplification technique. Rotational speed may be tracked through timing of the frames or other external methods such as other speed sensors, to correlate the instantaneous rotational speed to the acquired frames such that the motions measured and visualized in the triggered video frames can be determined to be occurring at specific turning speeds.

Another technique may be to trigger only the initial frame with an external trigger and then record at a set frame rate after the initial frame. This would allow for the use of an impact hammer or modal hammer to initiate data acquisition. The resulting data could then be correlated with the input data. A series of videos could be created this way, all starting for example at the time of impact of an object or when the shaft is at a particular phase. Averaging data from sets of images acquired due to triggers from repetitive impacting events could then facilitate identification of resonant frequencies in the structure being observed. Negative averaging of such data can be applied so that impact test can be performed on an operating machine. The machine is impacted multiple times as described above and the averaged frequency spectrum is calculated. Subsequent data is acquired with no impacting occurred and these averages are subtracted from the averaged impact frequency spectrum. The data in any frequency bin is not allowed to go below zero and the negative averaging continues until the lines in the spectrum associated with normal operation of the machine have been reduced significantly or to zero. The result of negative averaging is to remove peaks related to the normal operation revealing the peaks which are due to resonant frequencies in the structure excited by the impacts to the structure.

Still further, in another instance, multiple marks may be placed on the shaft. By way of example, again consider four marks equally placed as represented schematically in FIG. 13A, and their change in positioning as represented in FIGS. 13B and 13C when the shaft is rotating. Initially, only two marks are visible at a given time. For marks 1 and 2, as indicated in FIG. 13B, mark 1 is near the top of the shaft as seen by the camera. The system may track mark 1 as it moves down the shaft during rotation in order to measure how far it moved during each frame. Then as mark 1 is about to leave the field of view, the system may begin to track mark 4 as shown in FIG. 13C. When mark 4 is about to leave the field of view it may begin to track mark 3. When mark 3 is about to leave the field of view it may begin to track mark 2. In this way the measurements can be stitched together to create an accurate path for the entire rotation. By knowing the radius of the shaft it will be appreciated that the apparent displacement of the marks can be translated to angular motion. The process can be repeated and switched together to create a waveform showing the angular motion over time of the shaft for measurements of torsion or other shaft abnormalities.

Figure 13A:
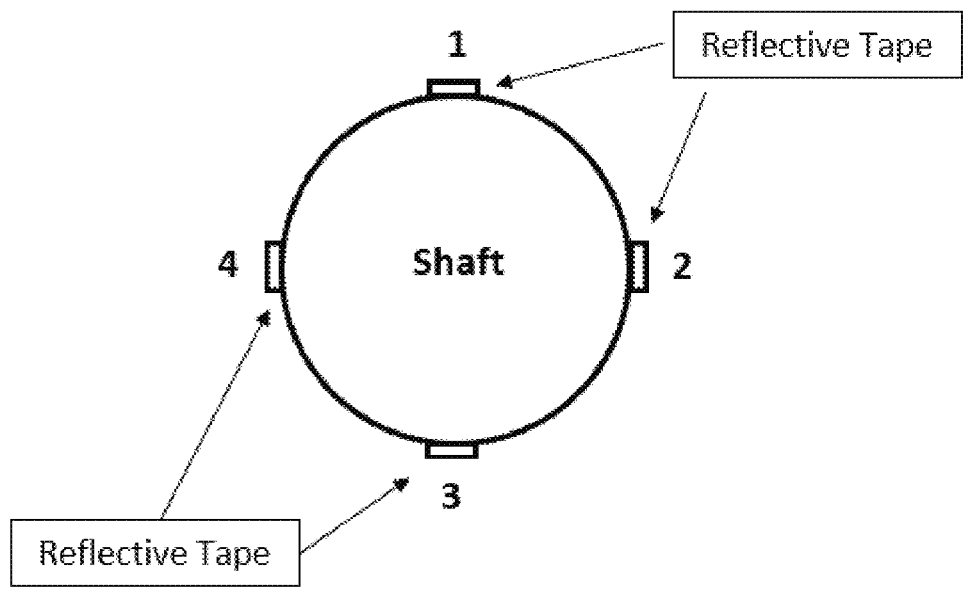
FIGS. 13A-C provide a schematic illustration of markings upon a unit such as the one shown in FIG. 11, associated with illustrating an example use of multiple embodiments and alternatives.
Figure 13B:
Figure 13C:

Thus, in FIGS. 13A-C, a series of marks, which could be reflective tape placements on the unit shown in FIG. 10 or 11, for example, are depicted and a change in the positioning of the marks based on the component's motion, is indicated. As indicated, this is done in order to compare for variations along the shaft, in which the delta between measured waveforms is associated with a variation in angular motion along the length of the shaft. FIG. 13B represents the shaft at a time designated as "A" in the figure, where four marks equally spaced around the shaft are at a given orientation relative to the shaft. The mark labeled "1" may be considered the given or equilibrium orientation, while mark "2" is at another orientation and also visible to the camera at this point. Later, at a time designated as "B" in FIG. 13C, the shaft has rotated such that mark "1" has moved to the bottom, and now mark "4" (not seen in the previous frame) has come into view. Conversely, in FIG. 13C, corresponding to time "B," the marks "2" and "3" are on the backside of the shaft and not visible to the camera at this point.

In FIGS. 13A-C, the series of marks is four in number, but a different number than 4 marks can be used as well. Many marks can be helpful such that switching between marks is made more frequently and closer to the position of the shaft closest to the camera. This would provide a more accurate measurement as the apparent vertical motion would be greatest and less affected by the curvature of the shaft.

In some embodiments, various options exist to account for bulk motion of a rotating component such as a shaft, to avoid a situation where non-torsional or non-rotational motion mimics torsional or shaft rotation. For example, an edge (top or bottom or both) of the shaft may be measured and the up and down motion of the entire shaft accounted for. The system may subtract off this motion such that any motion measured by the marks on the shaft has the bulk motion of the shaft removed. The shaft may rock also so multiple measurements along the length of the shaft on the edge may be made. An angle of the shaft rocking may be made this way and the rocking motion of the shaft may also be removed from the measurement of the motion of the markings. As desired or needed, various techniques may be employed to facilitate these adjustments, including optical flow, template matching, line profiling, edge detection, and others.

It will be understood that the embodiments described herein are not limited in their application to the details of the teachings and descriptions set forth, or as illustrated in the accompanying figures. Rather, it will be understood that the present embodiments and alternatives, as described and claimed herein, are capable of being practiced or carried out in various ways. Also, it is to be understood that words and phrases used herein are for the purpose of description and should not be regarded as limiting. The use herein of such words and phrases as "including," "such as," "comprising," "e.g.," "containing," or "having" and variations of those words is meant to encompass the items listed thereafter, and equivalents of those, as well as additional items.

Accordingly, the foregoing descriptions of embodiments and alternatives are meant to illustrate, rather than to serve as limits on the scope of what has been disclosed herein. The descriptions herein are not meant to limit the understanding of the embodiments to the precise forms disclosed. It will be understood by those having ordinary skill in the art that modifications and variations of these embodiments are reasonably possible in light of the above teachings and descriptions.

What is claimed is:

1. A method for evaluating a moving object undergoing periodic motion using at least one video acquisition device that acquires sampling data as a plurality of video images of the moving object which are divisible into individual video image frames, and with each frame being divisible into a plurality of pixels, comprising:

positioning at least one camera with a view of at least one moving component of a machine;

generating a plurality of pulsed signals based on a position of the moving component as the moving component undergoes periodic motion;

transmitting the plurality of pulsed signals to the at least one camera representing commands for the at least one camera to acquire images at a time relative to receipt of each pulsed signal; and combining the acquired images to create a video depicting motion of the moving component; and determining at least one occurrence of anomalous motion of the at least one moving component, wherein the anomalous motion Is selected from the group consisting of vibrations of the at least one moving component which are not harmonically related to the periodic motion of the moving object and nonsynchronous motion of the at least one moving component.

2. The method of claim 1, wherein the periodic motion is rotational motion.

3. The method of claim 1, wherein the periodic motion is reciprocating motion.

4. The method of claim 1, wherein the time relative to receipt of each pulsed signal is instantaneous with receipt.

5. The method of claim 1, wherein the plurality of pulsed signals is generated from one or more physical positions on the moving component as detected by an external sensor chosen from the group consisting of an optical sensor, a proximity sensor, and a second camera.

6. The method of claim 1, wherein the plurality of pulsed signals is generated from one or more physical positions on the moving component as detected by an external sensor chosen from the group consisting of an impact hammer, a vibration sensor, and a second camera.

7. The method of claim 1, further comprising processing the plurality of pulsed signals by an electronic circuit to produce a series of trigger pulses, wherein each of the series of trigger pulses represents a command for the at least one camera to acquire an image at a rate that is an exact multiple of an input pulse frequency.

8. The method of claim 7, wherein processing of the plurality of pulsed signals is performed via a phase lock loop circuit.

9. The method of claim 1, further comprising processing the plurality of pulsed signals by detuning an input frequency to produce a series of trigger pulses, wherein each of the series of trigger pulses represents a command for the at least one camera to acquire an image at a rate that is not an exact multiple of the input pulse frequency.

10. A method for performing impact testing on a machine or machine component using at least one camera that acquires sampling data as a plurality of video images which are divisible into individual video image frames, and with each frame being divisible into a plurality of pixels, comprising:
positioning the at least one camera with a view of at least one component of a machine;
generating an initiating pulse from an impact hammer or an accelerometer responsive to motion of the machine or machine component, wherein the initiating pulse is received by the at least one camera and triggers a start of a first data acquisition by the at least one camera;
acquiring and storing a plurality of frames acquired at a user-selected frame rate to measure a frequency range of interest and to stop the first data acquisition when a subsequent initiating pulse is received by the at least one camera that triggers a second data acquisition; and
processing one or more of the video image frames by creating frequency spectra at locations in a field of view that can be averaged to identify resonant frequencies.

11. The method of claim 10, wherein the frequency spectra at each location are averaged for all impacts to improve an identification of resonant frequency peaks when the machine is not in operation.

12. The method of claim 10, wherein the frequency spectra at each location are averaged for all impacts and then negative averaging is used for frequency spectra measured from the one or more of the video image frames when no impacting is occurring to improve an identification of resonant frequency peaks when the machine is in operation.

13. A method for performing impact testing on a machine or machine component using at least one camera that acquires sampling data as a plurality of video images which are divisible into individual video image frames, and with each frame being divisible into a plurality of pixels, comprising:
positioning the at least one camera with a view of at least one component of a machine;
generating an initiating pulse responsive to motion of the machine or machine component, wherein the initiating pulse is received by the at least one camera and triggers a start of a first data acquisition by the at least one camera;
acquiring and storing a data collection event comprising a number of frames acquired at a frame rate as specified by the user to measure a frequency range of interest and then stopping data acquisition until subsequent initiating pulses are received by the at least one camera that trigger subsequent data collection events; and
processing each data collection event by creating frequency spectra at one or more locations in a field of view and averaging the frequency spectra to identify resonant frequencies.

14. The method of claim 13, wherein the machine or machine component is not in operation, and wherein one or more peaks in an averaged frequency spectrum from the one or more locations for data collection events generated by an initiating pulse provide identification of one or more resonant frequencies of the at least one component.

15. The method of claim 13, wherein the machine is in operation and additional data collection events are acquired while no effects from any initiating pulse are present, and wherein the frequency spectra from each data collection event undergo negative averaging with the averaged frequency spectra formed from the triggered data collection events until all frequency peaks associated with a normal operation of the machine have been effectively removed, and the peaks in a residual spectrum at the one or more locations provide identification of one or more resonant frequencies of the at least one component.

16. The method of claim 13, wherein the initiating pulse is generated from an impact hammer or an accelerometer.

* * * * *